3,018,826
METHOD FOR INCREASING THE PERMEABILITY OF SUBTERRANEAN FORMATIONS
Burton B. Sandiford, Placentia, Calif., assignor to Union Oil Company of California, Los Angeles, Calif., a corporation of California
Filed June 16, 1958, Ser. No. 742,080
12 Claims. (Cl. 166—9)

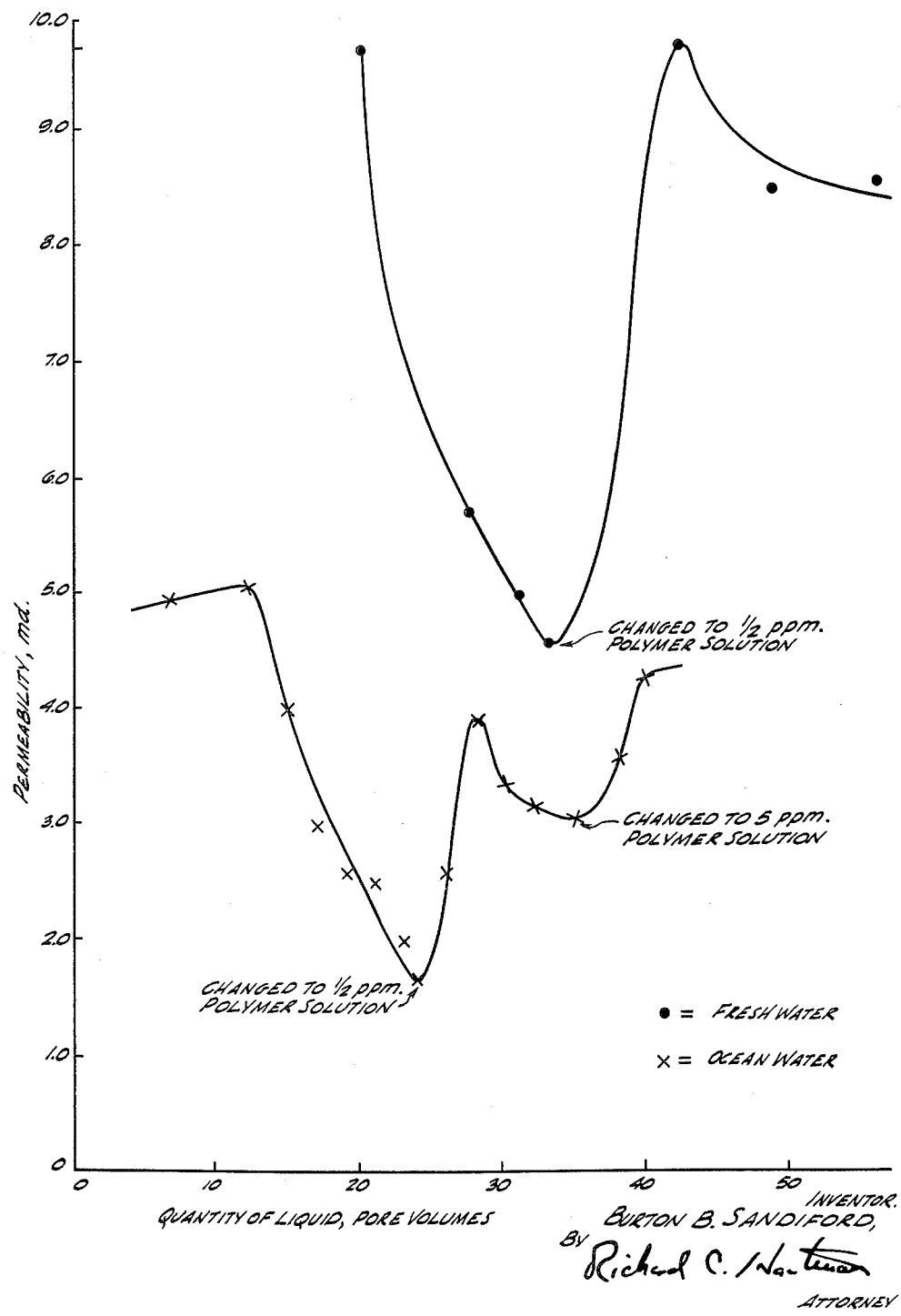

This invention relates to a method of increasing the effective permeability of subterranean formations, and in particular concerns a method for increasing the effective permeability of oil-bearing formations with respect to water or aqueous solutions.

In the recovery of petroleum from subterranean formations, there are a number of instances in which it is desirable to increase the permeability of the formation with respect to water or aqueous solutions. For example, in the well-known technique of water-flooding, whereby an aqueous flooding medium is injected into an oil-bearing formation from one or more injection wells, it is of course desirable that the permeability of the formation with respect to water be as high as possible. In many locations, however, the formation comprises clays which swell in the presence of water. The swollen clays impede the flow of the aqueous flooding medium, with the result that as the flooding operation continues it becomes more and more difficult to force the aqueous flooding medium through the formation, the flow of flooding medium through the formation becomes less and less uniform, and the general efficiency of the entire operation gradually decreases. It is also common practice to introduce chemical agents in the form of aqueous solutions into producing wells, and to force such solutions out into the oil-bearing formation with the object of increasing oil production from the formation. Thus, the well-known acidizing treatment consists of forcing an aqueous mineral acid from the producing well into the formation with the object of dissolving limestone and enlarging the pores and fissures through which the petroleum flows into the well. Obviously, such operation can succeed only if the permeability of the formation with respect to the aqueous acid is sufficiently high to allow the acid to penetrate deeply into the formation. Another occasion for increasing the permeability of a formation with respect to water arises when water-blocking or coning is encountered.

It is accordingly an object of the present invention to provide a method for increasing the permeability of subterranean formations with respect to water and aqueous solutions.

Another object is to provide an improved process for recovering petroleum by water-flooding.

A further object is to provide a well treating process whereby the formations traversed by the well are rendered more receptive to subsequent treating with an aqueous treating agent.

Other and related objects will be apparent from the following detailed description of the invention, and the various advantages thereof not referred to specifically will occur to those skilled in the art upon employment of the invention in practice.

I have now found that the foregoing objects and attendant advantages can be realized by a treatment which consists essentially in contacting the subterranean formation with a very dilute aqueous solution of certain polymeric alkylene oxides. More particularly, I have found that the permeability of subterranean formations with respect to very dilute aqueous solutions of polymerized lower alkylene oxides is markedly greater than with respect to ordinary water or brine. I have further found that advantage may be taken of this phenomenon in a number of ways. In water-flooding, for example, a very material increase in efficiency can be obtained by incorporating one of such polymers in the flooding medium. Similarly, in acidizing or other treatment with an aqueous treating agent, highly improved results can be attained either by initially treating the formation with an aqueous solution of a polymeric alkylene oxide of the present class prior to use of the treating agent, or by incorporating one of such polymers in the aqueous treating agent. The invention thus consists essentially in treating a subterranean formation with an aqueous solution of a polymerized lower alkylene oxide to reduce the permeability of the formation with respect to water, and in particular consists of a water-flooding process in which at least part of the aqueous flooding medium consists of an aqueous solution of a polymerized lower alkylene oxide.

The alkylene oxide polymers which are employed in accordance with the invention are water-soluble polymers of alkylene oxides containing from 2 to 4 carbon atoms, e.g., polymers of ethylene oxide, 1,2-propylene oxide, trimethylene oxide, isobutylene oxide, 2,3-epoxybutane, 1,2-epoxybutane, etc., having molecular weights such that a 5 percent by weight aqueous solution of the same has a viscosity of at least about 200 centipoises at 20° C. As is well known (see Ellis, "The Chemistry of Synthetic Resins," vol. II, pp. 990–992), polyethylene oxide, which is representative of the present polymeric alkylene oxides, has the molecular structure:

$$\text{HO}—\text{C}_2\text{H}_4—\text{O}—[\text{C}_2\text{H}_4—\text{O}—]_x—\text{C}_2\text{H}_4\text{OH}$$

wherein $x$ represents the degree of polymerization. The present polymers are thus quite distinct from the products obtained by esterifying an acid or etherifying a phenol with an alkylene oxide or a polyglycol. The present polymers are colorless thermoplastic resins, soluble in halogenated organic solvents as well as in water, and have a highly ordered crystalline structure. They are obtained by subjecting the monomeric alkylene oxide, usually in admixture with a diluent such as butane, to somewhat elevated temperatures in the presence of an active alkaline-earth metal carbonate catalyst. Alkaline-earth derivatives of organic mono- and poly-hydroxy compounds, e.g., strontium methylate, calcium glycolate, etc., may also be employed as catalysts. The polymers range in molecular weight from as low as 50,000 up to several million, and the viscosity of their aqueous solutions varies accordingly from as low as about 200 centipoises at 5 percent concentration to as high as 7000 or more centipoises at 1 percent concentration. Being entirely non-ionic they are entirely stable with respect to precipitation from aqueous solution by anions or cations. While any of such polymerized alkylene oxides may be employed in the practice of the invention, it is preferred to use polymerized ethylene oxide of such molecular weight that a 1 percent by weight aqueous solution of the same has a viscosity between about 500 and about 4000 centipoises at 20° C. Such a product is available commercially under the general trade name "Polyox" (Union Carbide Chemicals Co.) and can be obtained in several specific viscosity grades.

As stated, the aforementioned polymers are employed in very dilute aqueous solutions, i.e., in concentration ranging from about 0.05 to about 10 parts per million.

The process of the present invention is thus clearly distinguished from the secondary recovery process described and claimed in my co-pending application, Serial No. 701,724, filed December 10, 1957, which invention consists in part of a water-flooding operation in which the aqueous flooding medium comprises a polymerized alkylene oxide solution of such concentration that the solution has a viscosity greater than about 1 centipoise at the formation temperature. Polymer solutions of such viscosity contain far more polymer than the 10 parts per million which constitutes the upper limit in the concentration of the present solution, and the modus operandi of that invention lies in the increased sweep efficiency and more uniform sweep pattern attained through the use of a viscous flooding medium. The modus operandi of the present invention is not entirely understood but since the very small amounts of polymer employed effect no detectable increase in viscosity, it is not connected with any viscosity effect; very probably it lies in an ability of extremely dilute alkylene oxide polymer solutions to coagulate or otherwise affect the naturally-occurring clays which reduce the permeability of subterranean formations.

The following experimental procedure has been employed to demonstrate the marked effect of very dilute aqueous solutions of polymerized lower alkylene oxides in the permeability of a typical oil-bearing formation: A cylindrical sand core, 1" in diameter by 2½" long, taken from the Torrey Field of Southern California is mounted in a Lucite core-holder equipped with inlet and outlet fittings at its opposite ends. Under the influence of suction applied at the outlet fitting, fresh or ocean water (the latter being of special interest as a flooding medium in Southern California) is flowed into the core until it is saturated. The saturated core is then placed in a constant temperature bath maintained at 75° F., and fresh or ocean water, as the case may be, is flowed through the core under a differential pressure of 25 p.s.i.g. The rate of such flow is observed from time to time and the permeability is calculated from the observed rate of flow. Characteristically, the permeability declines steadily as the flow of water through the core is continued. When the pattern of permeability has become established, which usually occurs by the time the volume of water flowed through the core is about 15 to 50 times the pore volume of the core, the fresh or ocean water is replaced with a solution of alkylene oxide polymer, and the experiment is continued. Again, the rate of flow is observed from time to time, and the permeability is calculated from each of such observations. In a typical experiment, a total of 33 pore volumes of fresh water were passed through the saturated core, after which a ½ p.p.m. aqueous solution of polymerized ethylene oxide (viscosity of 1% aqueous solution=3000 centipoises at 20° C.) was substituted for the water. The experiment was continued until a total of 56 pore volumes of fluid had been passed through the core. The following data were obtained:

| Identity of Liquid Passed through Core | Volume of Liquid Passed through Core, Pore Volumes | Permeability, md. |
|---|---|---|
| Fresh Water | 20 | 9.65 |
| Do | 27.5 | 5.75 |
| Do | 31 | 5.0 |
| Do | 33 | 4.6 |
| Polymer Solution, ½ p.p.m. | 42 | 9.7 |
| Do | 48.5 | 8.5 |
| Do | 56 | 8.55 |

In a second experiment, ocean water was employed instead of fresh water. The change-over from ocean water to the ½ p.p.m. polymer solution was made at 24 pore volumes, and a second change-over from the ½ p.p.m. polymer solution to a 5 p.p.m. polymer solution was made at 35 pore volumes. The polymer solutions were made with ocean water in order to simulate a flooding operation in which the polymer is added to an ocean water flooding medium. The following data were obtained:

| Identity of Liquid Passed through Core | Volume of Liquid Passed through Core, Pore Volumes | Permeability, md. |
|---|---|---|
| Fresh Water | 6.8 | 4.9 |
| Do | 12.0 | 5.1 |
| Do | 15.0 | 4.0 |
| Do | 17.0 | 3.0 |
| Do | 19.0 | 2.6 |
| Do | 21.0 | 2.5 |
| Do | 23.0 | 2.0 |
| Do | 24.0 | 1.6 |
| Polymer Solution, ½ p.p.m. | 26.0 | 2.6 |
| Do | 28.0 | 3.9 |
| Do | 30.0 | 3.3 |
| Do | 32.0 | 3.2 |
| Do | 35.0 | 3.0 |
| Polymer Solution, 5 p.p.m. | 38.0 | 3.8 |
| Do | 40.0 | 4.3 |

The data tabulated above are graphically presented in the drawing which accompanies and forms a part of this specification.

As previously stated, the principle of the invention is most suitably applied to the secondary recovery of petroleum by flooding with an aqueous flooding medium. In general, conventional procedure is employed, i.e., the injection and production wells are suitably fitted with packers if required, and the flooding medium is forced down the injection well or wells. According to one embodiment of the invention, the flooding medium is of fixed composition, i.e., it consists of an aqueous solution containing between about 0.05 and about 10 p.p.m. of one or a mixture of the aforementioned alkylene oxide polymers, together with any of the conventional flooding medium adjuvants which may be desired, e.g., bactericides, surface active or wetting agents, corrosion inhibitors, etc. The water in which the polymer and any such adjuvant is added may be fresh water, ocean water, oil-field brine, or the like. The term "water" as herein employed is meant to include any of the water or natural artificial brines commonly employed as flooding media.

In accordance with another embodiment of the invention the polymer solution is employed incrementally. For example, the flooding operation is carried out with ordinary water or brine until the injectivity rate (i.e., the permeability of the reservoir with respect to such water or brine) declines to an unacceptable value. The initial part of the curves of the accompanying drawing illustrates such typical decline. The water or brine flooding medium is then replaced by the polymer solution, and the flooding operation is resumed until the injectivity rate increases, whereupon the polymer solution is replaced by the water or brine and the operation is continued. Alternatively, the flooding operation may be begun with the polymer solution and thereafter continued with water or brine. In other words, the polymer solution may be employed in alternation with other aqueous flooding media.

Use of the polymers in accordance with the invention may also be incorporated into the flooding process disclosed in the aforesaid co-pending application Serial No. 701,724. Thus, the reservoir may be initially flooded with a viscous solution of a lower alkylene oxide polymer, e.g., a solution of about 1 percent concentration and having a viscosity of about 700 centipoises at 20° C., until a suitable thickness of viscous flooding front is attained within the reservoir. The supply of viscous polymer solution is then cut off, and flooding is continued with a non-viscous polymer solution of only about 0.05 to 10 p.p.m. concentration. The amount of viscous solution necessary to provide a flooding front of adequate thickness will depend upon the distance between the injection and production wells and their spacing, as well as upon the porosity of the intervening formation. Desirably, the volume of the viscous flooding medium should correspond to between about 1 and about 10 percent of the volume of hydrocarbon pore space of the reservoir. The use of a viscous polymer solution in combination with a very dilute non-viscous polymer solution may also be combined with the use of an ordinary water or brine flooding medium as previously explained.

In addition to its specific application to water flooding operations, the principle of the invention is applicable to any well treatment process in which an aqueous treating agent is injected into one or more subterranean formations, e.g., acidizing, water-block removal, selective plugging, permeability-increasing, etc. Preferably, the dilute polymer solution is employed in addition to, rather than in combination with, such aqueous treating agent. Thus, in an acidizing treatment, it is preferred first to inject the polymer solution into the formation until maximum permeability is attained, and thereafter to inject the acid in the conventional manner. Similarly, in selective plugging with an aqueous plugging agent, it is preferred to treat the formation to be plugged with the polymer solution prior to injecting the plugging agent. In some instances, however, depending upon the nature of the treating agent, the polymer may be incorporated directly into the aqueous treating composition, and the treatment effected with the resulting product.

Other modes of applying the principle of my invention may be employed instead of those explained, change being made as regards the methods or materials employed, provided the step or steps stated by any of the following claims, or the equivalent of such stated step or steps, be employed.

I, therefore, particularly point out and distinctly claim as my invention:

1. The process for increasing the permeability with respect to water of a subterranean formation traversed by a well bore which comprises introducing into said well bore an aqueous solution of a water-soluble polymer of an alkylene oxide selected from the class consisting of ethylene oxide, a propylene oxide, and a butylene oxide, and forcing said solution into said formation, said solution having a viscosity less than 1 centipoise at the formation temperature and containing between about 0.05 and about 10 parts per million of said polymer, and said polymer having a molecular weight such that a 5 percent by weight aqueous solution thereof has a viscosity of at least about 200 centipoises at 20° C.

2. The process of claim 1 wherein the said polymer is a water-soluble polymer of ethylene oxide.

3. The process of claim 2 wherein the said polymer has a molecular weight such that a 1 percent by weight aqueous solution thereof has a viscosity between about 500 and about 4000 centipoises at 20° C.

4. The process for recovering oil from a subterranean oil-bearing formation which comprises introducing into an input well penetrating said formation a flooding medium consisting essentially of an aqueous solution of a water-soluble polymer of an alkylene oxide selected from the class consisting of ethylene oxide, a propylene oxide and a butylene oxide, and forcing said medium through said formation toward an output well penetrating said formation at a distance from said input well, said solution having a viscosity less than 1 centipoise at the formation temperature and containing between about 0.05 and about 10 parts per million of said polymer, and said polymer having a molecular weight such that a 5 percent by weight aqueous solution thereof has a viscosity of at least about 200 centipoises at 20° C.

5. The process of claim 4 wherein the said polymer is a water-soluble polymer of ethylene oxide.

6. The process of claim 5 wherein the said polymer has a molecular weight such that a 1 percent by weight aqueous solution thereof has a viscosity between about 500 and about 4000 centipoises at 20° C.

7. The process for recovering oil from a subterranean oil-bearing formation which comprises introducing into an input well penetrating said formation a viscous first flooding medium consisting essentially of an aqueous solution of a water-soluble polymer of an alkylene oxide selected from the class consisting of ethylene oxide, a propylene oxide and a butylene oxide, said polymer having a molecular weight such that a 5 percent aqueous solution thereof has a viscosity of at least about 200 centipoises at 20° C.; forcing sufficient of said first flooding medium into said formation to establish a viscous flooding front; introducing into said input well a non-viscous second flooding medium consisting essentially of an aqueous solution having a viscosity less than 1 centipoise at the formation temperature and containing between about 0.05 and about 10 parts per million of a water-soluble polymer of an alkylene oxide selected from said class; and applying to said second flooding medium sufficient pressure to force said first flooding medium through said formation toward at least one output well penetrating said formation at a distance from said input well, thereby displacing the oil in said formation by said first flooding medium and in turn displacing said first flooding medium by said second flooding medium, said first flooding medium containing said polymer in such amount that it has a viscosity of at least about 1 centipoise at the formation temperature.

8. The process of claim 7 wherein the polymer contained in said first and second flooding media is a water-soluble polymer of ethylene oxide.

9. The process of claim 8 wherein the said polymer has a molecular weight such that a 1 percent aqueous solution thereof has a viscosity between about 500 and about 4000 centipoises at 20° C.

10. In a water-flooding process wherein an aqueous flooding medium is introduced into an input well penetrating an oil-bearing formation under sufficient pressure to force said flooding medium through said formation toward an outlet well penetrating said formation at a distance from said input well, and the permeability of said formation with respect to said flooding medium declines to a low value, the improvement which consists in cutting off the supply of said flooding medium, introducing into the well an aqueous solution having a viscosity less than 1 centipoise at the formation temperature and containing between about 0.05 and about 10 parts per million of a water-soluble polymer of an alkylene oxide selected from the class consisting of ethylene oxide, the propylene oxide and a butylene oxide under sufficient pressure to force said aqueous solution into said formation, and thereafter resuming the forcing of said flooding medium through said formation, sufficient of said aqueous solution being employed to effect a substantial increase in said permeability above said low value and said polymer having a molecular weight such that a 1 percent aqueous solution of the same has a viscosity of at least about 200 centipoises at 20° C.

11. The process of claim 10 wherein the said flooding medium is an aqueous solution of a water-soluble polymer of ethylene oxide having a viscosity greater than about 1 centipoise at the formation temperature, and said polymer is a water-soluble polymer of ethylene oxide.

12. The process of claim 11 wherein the said polymer has a molecular weight such that a 1 percent aqueous solution thereof has a viscosity between about 500 and about 4000 centipoises at 20° C.

References Cited in the file of this patent

UNITED STATES PATENTS

| | | |
|---|---|---|
| 2,341,500 | Detling | Feb. 8, 1944 |
| 2,677,700 | Jackson | May 4, 1954 |
| 2,851,105 | Garst | Sept. 9, 1958 |